United States Patent
Doemens et al.

(10) Patent No.: US 7,855,657 B2
(45) Date of Patent: Dec. 21, 2010

(54) DEVICE FOR COMMUNICATING ENVIRONMENTAL INFORMATION TO A VISUALLY IMPAIRED PERSON

(75) Inventors: Günter Doemens, Holzkirchen (DE); Peter Mengel, Eichenau (DE); Wolfgang Stark, Stadtbergen/Deuringen (DE)

(73) Assignee: Siemens Aktiengesellschaft, Munich (DE)

( * ) Notice: Subject to any disclaimer, the term of this patent is extended or adjusted under 35 U.S.C. 154(b) by 604 days.

(21) Appl. No.: 11/794,900

(22) PCT Filed: Jan. 10, 2006

(86) PCT No.: PCT/EP2006/050112
§ 371 (c)(1), (2), (4) Date: Jul. 9, 2007

(87) PCT Pub. No.: WO2006/074993
PCT Pub. Date: Jul. 20, 2006

(65) Prior Publication Data
US 2008/0088469 A1    Apr. 17, 2008

(30) Foreign Application Priority Data
Jan. 13, 2005  (DE) .................. 10 2005 001 676
Feb. 28, 2005  (DE) .................. 10 2005 009 110

(51) Int. Cl.
*G08B 21/00* (2006.01)
*G09B 21/00* (2006.01)
*H04B 3/36* (2006.01)

(52) U.S. Cl. ............... 340/686.6; 340/825.19; 340/407.1; 340/555; 340/7.6; 434/112; 434/114

(58) Field of Classification Search ............. 340/686.6, 340/825.19, 407.1
See application file for complete search history.

(56) References Cited

U.S. PATENT DOCUMENTS

| | | | |
|---|---|---|---|
| 4,712,003 A * | 12/1987 | Ban et al. ............. 250/221 |
| 5,487,669 A | 1/1996 | Kelk et al. |
| 6,198,395 B1 * | 3/2001 | Sussman ............. 340/573.1 |
| 6,298,010 B1 * | 10/2001 | Ritz et al. ............. 367/116 |
| 6,356,210 B1 | 3/2002 | Ellis |
| 6,489,605 B1 | 12/2002 | Ritz et al. |
| 2003/0063776 A1 | 4/2003 | Sato |
| 2004/0136571 A1 | 7/2004 | Hewitson et al. |

FOREIGN PATENT DOCUMENTS

| | | |
|---|---|---|
| CN | 1404806 | 3/2003 |
| DE | 198 53 915 A1 | 5/2000 |
| DE | 100 04 841 A1 | 8/2000 |
| EP | 0 410 045 A1 | 1/1991 |
| FR | 2 715 831 A | 8/1995 |
| WO | 03/107039 A2 | 12/2003 |

\* cited by examiner

*Primary Examiner*—Donnie L Crosland
(74) *Attorney, Agent, or Firm*—Young & Thompson

(57) ABSTRACT

An aid for a blind person (1), includes a distance sensor (3), which creates a distance image of an object (2). The distance information that is generated by the distance sensor (3) is transmitted to a tactile matrix (10), which is integrated into a guide stick (11). The blind person (1) obtains information about his or her environment by touching the tactile matrix (10).

17 Claims, 3 Drawing Sheets

Figure 1:
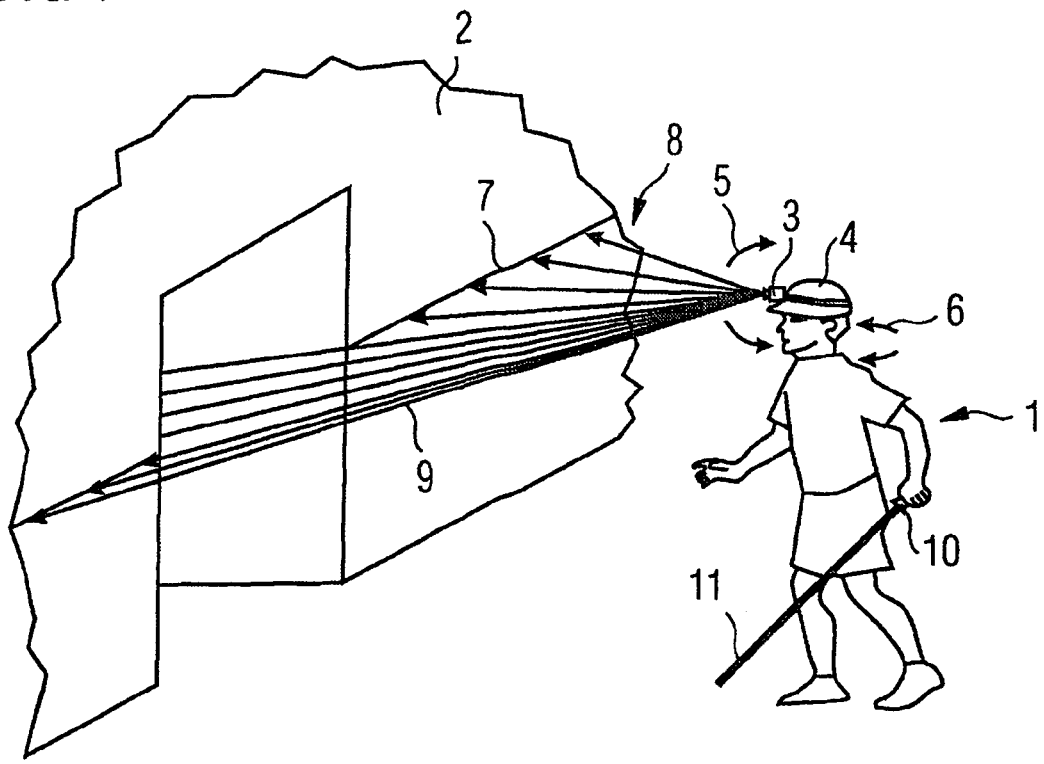

U.S. Patent
Dec. 21, 2010
Sheet 1 of 3
US 7,855,657 B2

DEVICE FOR COMMUNICATING ENVIRONMENTAL INFORMATION TO A VISUALLY IMPAIRED PERSON

BACKGROUND OF THE INVENTION

1. Field of the Invention

The invention relates to a device for communicating environmental information to a visually impaired person, said device comprising an information transmitter and a playback device which converts information supplied by the information transmitter into a signal which can be perceived by the visually impaired person.

2. Description of the Related Art

Devices of this kind are generally known. With such devices it is possible for example to make the information displayed on a computer screen readable for a blind person. For this purpose a text displayed by the computer monitor is converted by a tactile matrix into a height profile which can be deciphered by touching by the blind person. A tactile matrix typically consists of a plurality of two-dimensionally arranged feeler pins which can be individually raised by an actuating device.

Outside their own residence and their accustomed environment blind people are reliant on orientation aids such as a white cane or guide dog. However, both aids only allow a limited degree of mobility. Moreover the blind person can find his or her bearings at close range, i.e. within a distance of about one meter, without further aids by means of his or her sense of touch. Beyond this distance range the blind person's current and real environment is revealed to him/her directly only by means of acoustic impressions.

SUMMARY OF THE INVENTION

Proceeding from this prior art the object underlying the invention is to create a device for communicating environmental information to a visually impaired person by means of which a visually impaired person's orientation ability and confidence in movement can be substantially improved.

This object is achieved by means of a device having the features of the independent claim. Advantageous embodiments and developments are set forth in the dependent claims.

The device for communicating environmental information to a visually impaired person comprises a distance sensor which can be attached to the body of the visually impaired person. The distance information supplied by the distance sensor is played back by way of a portable playback device.

Distance sensors can be manufactured as integrated components. A distance sensor of this kind can be worn without problems by a visually impaired person. Since the measurement range of a distance sensor extends far beyond the local area which the visually impaired person can register by means of touch, the range of perception of a visually impaired person is considerably extended by means of the device. The device therefore helps in considerably increasing the orientation ability and confidence in movement of a visually impaired person.

In a preferred embodiment the embodiment the distance sensor operates according to the principle of light transit time measurement. Distance sensors of this kind operate independently of daylight and of the optical properties of the reflecting objects. Furthermore distance sensors of said type have a great measuring accuracy of approximately one centimeter.

Functional elements specific to the distance sensor are preferably integrated at least partially into an optoelectronic semiconductor component. In this context a distance-sensor-specific functional element should be understood to mean all functional elements which serve to determine at least one measured variable that can be used for calculating distance. Functional elements serving to supply power to and to buffer an integrated semiconductor component are to be excluded therefrom, however. The functional elements specific to the distance sensor therefore include at any event those functional elements in which light is generated and received. If the functional elements specific to the distance sensor are integrated in a semiconductor component or a plurality of semiconductor components, small, lightweight distance sensors are produced which can be worn without difficulty on the body.

The distance sensor can be integrated into an item of headgear. In this case the visually impaired person can change the orientation of the visual field of the distance sensor by movements of the head.

In a preferred embodiment the distance information supplied by the distance sensor is played back via a portable feeler device. For this purpose the portable feeler device can embody variable height profiles which can easily be made out by touching by the visually impaired person. In this way even complex distance information can be communicated to a visually impaired person.

In a further preferred embodiment the distance sensor has a linear visual field. Furthermore a feeler surface of the feeler device is implemented so as to correspond to the beam fan of the distance sensor. The distance profile of an object in the visual field is then reproduced by means of a height step which is embodied on the feeler surface and follows the shape of the distance profile.

This embodiment offers the advantage that the distance information can be relayed easily and robustly to the visually impaired person, since the outlines of the objects which are situated within the visual field of the distance sensors are to a certain degree reproduced on the feeler surface. A movement of the object can also be registered in a simple manner, since in this case the height step moves on the feeler surface in accordance with the movement of the object.

In a further preferred embodiment the visual field is extended in terms of surface area. In this case a height profile corresponding to the distance image is embodied on the feeler surface.

This embodiment thus provides the visually impaired person not just with the outline of the external contours of an object, but with a complete distance image. A disadvantage, however, is that the distance resolution is low, since the entire distance measurement range of the distance sensor has to be represented by means of the relatively short travel of the feeler pins.

The feeler device is preferably a tactile matrix which is integrated into a guide cane. In this way the visually impaired person has the feeler device constantly to hand when he or she reaches for the guide cane.

The device also enables information about the speed of objects in the visual field to be communicated. It is possible for example to cause areas of the feeler surface which reproduce a fast moving object to vibrate as a function of the speed of the object. In this way the visually impaired person is made aware of objects which are approaching him or her at speed.

BRIEF DESCRIPTION OF THE DRAWING FIGURES

Figure 2:
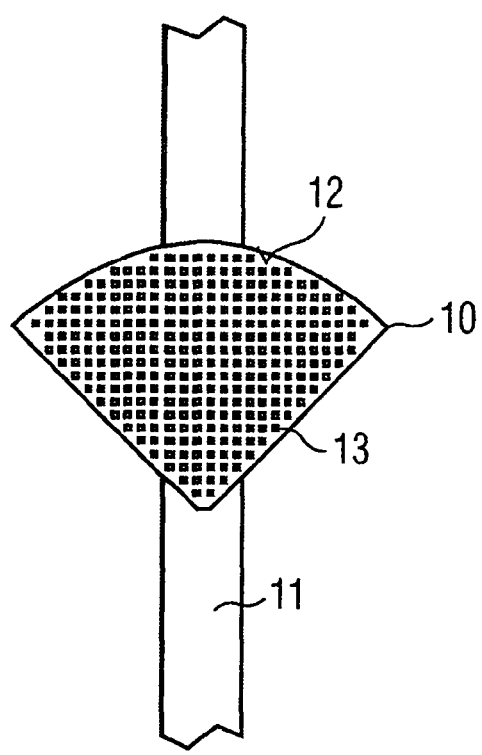
Figure 5:
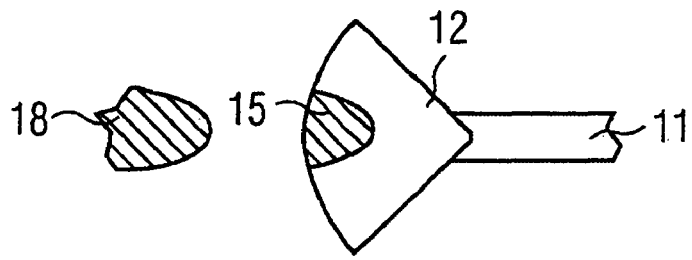
Figure 6:
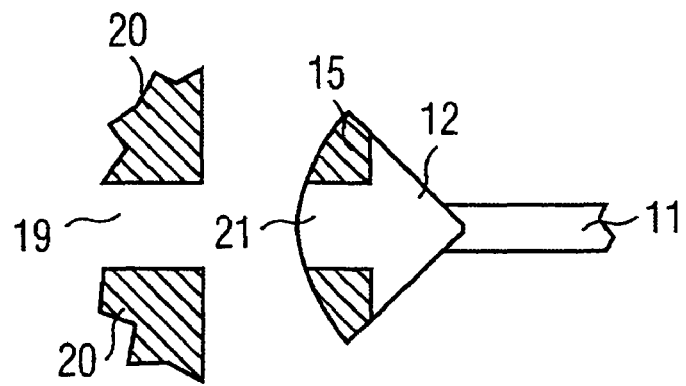
Figure 7:
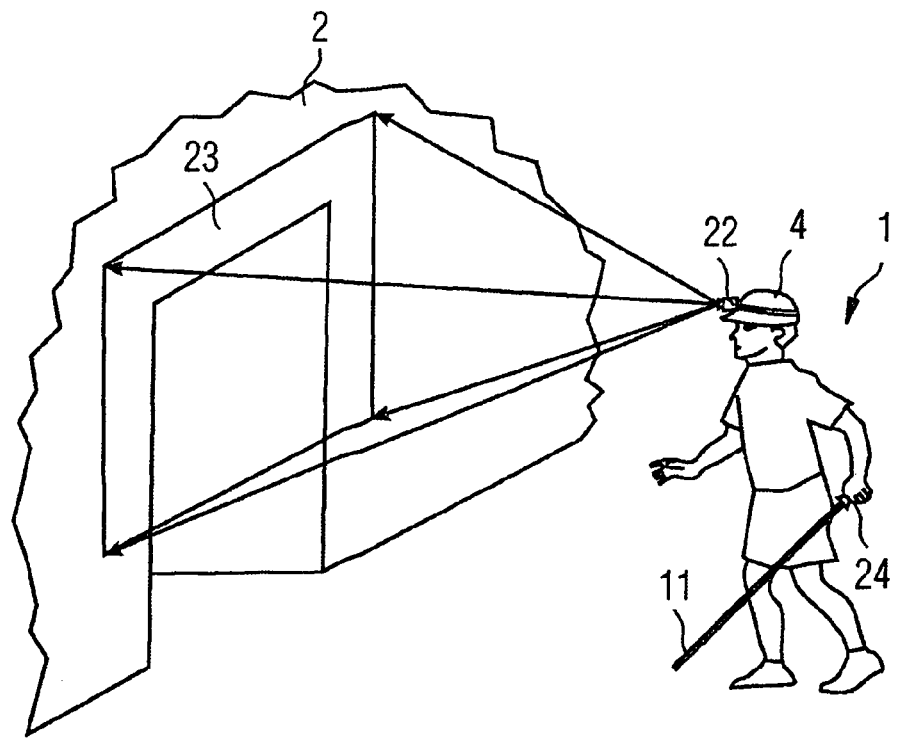
Figure 8:
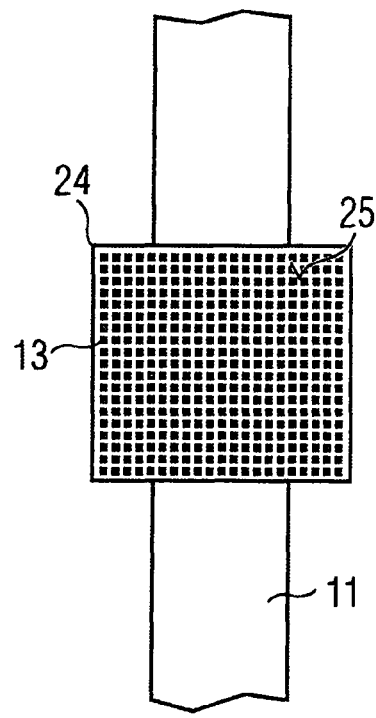
Figure 9:
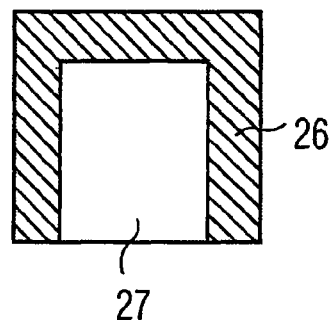

Further features and advantages of the invention will emerge from the following description in which exemplary embodiments of the invention are explained in detail with reference to the accompanying drawing, in which:

FIG. 1 shows a blind person who is finding his bearings in the area of a passage with the help of an aid device, FIG. 2 shows a plan view of a tactile matrix attached to a guide cane, FIGS. 3 to 6 show the representation of the external contours of different objects on the tactile matrix according to FIG. 2, FIG. 7 shows the representation of a further aid device with extended visual field in terms of surface area, FIG. 8 shows a plan view of the tactile matrix of the aid device from FIG. 7, and FIG. 9 shows the representation of the object from FIG. 7 on the tactile matrix from FIG. 8.

DETAILED DESCRIPTION OF THE INVENTION

FIG. 1 shows a blind person 1 who is finding his bearings with the help of an aid device in the area of an object 2. In FIG. 1 said object 2 is a wall in which a passage is embodied. The aid device comprises a distance sensor 3 which is integrated into an item of headgear 4 of the blind person 1. The headgear 4 can be, for example, a headband, cap or hat. The distance sensor 3 can also be worn on some other part of the body of the blind person 1, however. For example, the distance sensor 3 can also be integrated into a pair of sunglasses.

The distance sensor 3 preferably operates on the basis of a light transit time measurement. With distance sensors of said type, which require no mechanically moving parts, a laser light illumination is modulated synchronously with the sensitivity of photosensitive receivers which are disposed on the surface of a semiconductor component either in the form of a row or in the form of a matrix. Various basic principles for distance sensors 3 of said type, including those referred to by the term PMD (=Photonic Mixing Device) or MDSI (=Multiple Double Short Time Integration), are known to the person skilled in the art. An advantage of light transit time measurement is that this can be performed with the aid of integrated semiconductor components. In that respect this results in small and lightweight distance sensors which can be worn without difficulty on the body.

In principle distance sensors having mechanical deflection units are also conceivable. Lightweight and robust deflection units can be created in particular with the aid of silicon micromechanics.

By inclining 5 or turning 6 his head the blind person 1 can direct a linear visual field 7 of the distance sensor 1 onto a spatial area of interest. In order to scan the visual field 7 the distance sensor 3 emits a beam fan 8 which comprises a plurality of sensor beams 9 which are distributed preferably uniformly over the angular extension of the linear visual field 7. For example, 64 sensor beams can be distributed over an angle of vision of 100 degrees. The distance images recorded at a frequency of 10 Hz for example are reproduced with the aid of a tactile matrix 10 which is integrated into a guide cane 11. The distance information contained in the distance images is transmitted preferably wirelessly between the distance sensor 3 and the tactile matrix 10.

FIG. 2 shows a plan view of the tactile matrix 10 integrated in the guide cane 11. Arranged on a feeler surface 12, the tactile matrix 10 has a plurality of feeler pins 13 which can be raised above the feeler surface 12. Tactile matrices are known to the person skilled in the art and as such are not the subject matter of the invention.

The feeler surface 12 of the tactile matrix 10 is embodied so as to correspond to the beam fan 8 of the distance sensor 3. The feeler surface 12 is therefore embodied preferably in the shape of a circular segment.

If an object 2 is situated in the visual field 7 of the distance sensor 3, there is generated on the feeler surface 12 a height step which can be easily made out by touching by the blind person 1 and whose shape across the feeler surface 12 corresponds to the external contours of the object 2.

FIGS. 3 to 6 each show the outline of the object 2 that is situated in the visual field 7 and the associated display on the feeler surface 12.

Figure 3:
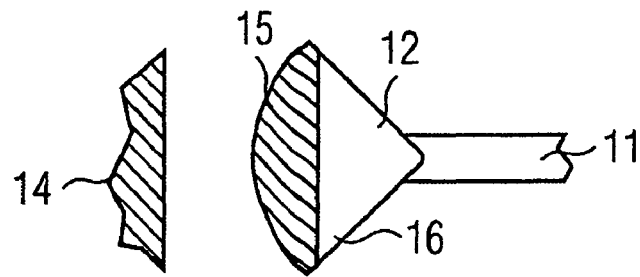

FIG. 3 shows the representation, on the feeler surface 12, of a wall 14 which is located immediately in front of the blind person 1. Corresponding to the external contours of the wall 14, the feeler pins 13 form an elevation 15 which is indicated in FIG. 3 by the shaded area of the feeler surface 12. In this case a height step 16 delimiting the elevation 15 moves across the feeler surface 12 as a function of the distance of the blind person 1 from the wall 14. Because the height step 16 can easily be made out by touching by the blind person 1, the blind person 1 receives information about the features of and distance from the wall 14.

Figure 4:
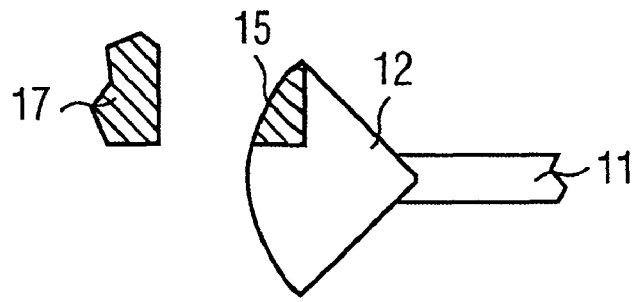

FIG. 4 shows the representation of a corner 17 on the feeler surface 12. In this case the elevation 15 is limited to a corner-shaped section of the feeler surface 12.

By feeling the elevation 15 on the feeler surface 12 with his fingers, the blind person 1 can determine his distance from the corner 17, which is for example the corner of a building, and give this a wide berth.

The details of the profiles of objects 2 can also be represented on the feeler surface 12.

FIG. 5 shows the representation of a rounded corner 18 on the feeler surface 12. In this case the height step 16 of the elevation 15 is rounded corresponding to the external contours of the corner 18.

FIG. 6, finally, shows the outline and the display of the object 2 represented perspectively in FIG. 1. The object depicted in FIG. 1 comprises a passage 19 in a wall 20. In this case the elevation 15 is restricted to two corner-shaped sections, with a depression 21 being located between the corner-shaped elevations 15, said depression 21 indicating the passage 19. By feeling the height profile embodied on the feeler surface 12 with his fingers, the blind person 1 receives information about the passage 2 which is located in front of him within the measurement range of the distance sensor 3. The blind person 1 can therefore approach the passage 19 already from a distance which corresponds to the measurement range of the distance sensor 3.

It should be noted that unobstructed areas can also be indicated by means of elevations in the same way as obstacles. In this case obstacles are indicated by means of a lowering of the feeler pins 13.

A further variation relates to the embodiment of the visual field 7. FIG. 7 shows a modified aid device. The aid device illustrated in FIG. 7 comprises a distance sensor 22 having a visual field 23 that is extended in terms of surface area. A tactile matrix 24 shown in FIG. 8 is provided for the purpose of representing the distance image recorded by the distance sensor 22. The feeler surface 25 of the tactile matrix is designed to correspond to the shape of the visual field 23. A height profile which corresponds to the distance image recorded by means of the distance sensor 22 is generated on the feeler surface 25. In this case the displacement of the feeler pins 13 is preferably proportional to the measured distance from the object 2. If no object 2 is situated in the visual field 23, the feeler pins 13 are retracted as far as possible. Conversely, if the object 2 is situated in close proximity to the blind person 1, the feeler pins are raised as far as possible.

FIG. 9 shows the display of the object 2 from FIGS. 1 and 6 on the feeler surface 25. Said object 2 is the wall 20 with the passage 19. In this case an elevation 26 which corresponds to the distance image of the wall 20 is embodied on the feeler surface 25. The passage 19 is indicated by means of a depression 27.

It should be noted that the tactile matrix 10 or 24 integrated into the guide cane 11 can offer both the representation of the outline of the external contours of an object 2 and the display of a distance image. This can be effected either by way of two separate feeler surfaces 12 and 25 or by way of a switchable feeler surface 12 or 35.

It is furthermore possible to represent speed components of each pixel in the direction of the blind person 1 via the tactile matrices 10 and 24. By direct and continuous recording of the distance image by means of the distance sensors 3 and 22 it is possible to calculate the speed of each pixel in the direction of the blind person 1 by comparison of two successive distance images. The speed information can be communicated to the blind person 1 for example by means of a speed-proportional vibration of the feeler pin 13 corresponding to the respective pixel. This makes the blind person aware of those objects 2 that are approaching him at speed. The display of the speed can modulate both the frequency and the amplitude of the vibration as a function of the speed. A vibration signal can also be communicated with the aid of a vibrator worn close to the body.

In a further modified embodiment the distance information is communicated to the blind person by way of an acoustic signal. For example, the immediate proximity of an obstacle can be indicated by means of a warning tone which is all the higher, the closer the blind person comes to the obstacle. In addition it is also conceivable, when an obstacle is approached, to output a spoken warning with the aid of a speech generator. The latter has the advantage that the warning will not be submerged in the ambient noise. The acoustic signal can be communicated inconspicuously by means of a hearing aid or a device which has the appearance of a hearing aid.

The aid devices described here facilitate the mobility of a blind person to a considerable degree. The perceptual capability of the blind person 1 equipped with the aid devices described here even partially exceeds that of a sighted person, for the aid devices described here operate even in complete darkness. The blind person 1 can therefore also find his bearings at nighttime. Furthermore reliable information about the distance and speed of objects 2 is communicated to the blind person 1.

The invention claimed is:

1. A device for communicating environmental information to a visually impaired person, said device comprising:
   an information transmitter comprising a distance sensor integrated into an item of headgear which can be attached to a body of the visually impaired person; and
   a playback device which converts information supplied by the information transmitter into signals which can be perceived by the visually impaired person, the playback device being a portable feeler device integrated into a guide cane and the portable feeler device reproduces distance information supplied by the distance sensor by way of height profiles.

2. The device as claimed in claim 1, wherein the distance sensor operates on a basis of a light transit time measurement.

3. The device as claimed in claim 1, wherein functional elements specific to the distance sensor are integrated into an optoelectronic semiconductor component.

4. The device as claimed in claim 1, wherein the distance sensor transmits distance information wirelessly to the playback device.

5. The device as claimed in claim 1, wherein the playback device reproduces the distance information by means of an acoustic signal.

6. The device as claimed in claim 1, wherein the distance sensor has a linear visual field.

7. The device as claimed in claim 1, wherein the distance sensor has a visual field that is extended in terms of surface area.

8. The device as claimed in claim 1, wherein the feeler device is a tactile matrix.

9. The device as claimed in claim 1, wherein the feeler device reproduces speed information relating to an object by means of a speed-dependent vibration of feeler elements assigned to the respective object.

10. The device as claimed in claim 2, wherein functional elements specific to the distance sensor are integrated into an optoelectronic semiconductor component.

11. The device as claimed in claim 2, wherein the distance sensor transmits distance information wirelessly to the playback device.

12. The device as claimed in claim 2, wherein the playback device reproduces the distance information by means of an acoustic signal.

13. A device for communicating environmental information to a visually impaired person, said device comprising:
   an information transmitter comprising a distance sensor having a linear visual field which can be attached to a body of the visually impaired person; and
   a playback device which converts information supplied by the information transmitter into signals which can be perceived by the visually impaired person, and the playback device is a portable feeler device which reproduces distance information supplied by the distance sensor by way of height profiles, wherein
   the feeler device has a feeler surface which is embodied so as to correspond to a beam fan of the distance sensor and on which a distance profile of an object situated in the visual field is reproduced by means of a height step following a shape of the distance profile.

14. The device as claimed in claim 13, wherein the feeler device is integrated into a guide cane.

15. The device as claimed in claim 13, wherein the distance sensor is integrated into an item of headgear.

16. The device as claimed in claim 13, wherein the playback device is a portable feeler device which reproduces the distance information supplied by the distance sensor by way of height profiles.

17. A device for communicating environmental information to a visually impaired person, said device comprising:
   an information transmitter comprising a distance sensor having a linear visual field which can be attached to a body of the visually impaired person, and the distance sensor has a visual field that is extended in terms of surface area; and
   a playback device which converts information supplied by the information transmitter into signals which can be perceived by the visually impaired person, and the playback device is a portable feeler device which reproduces distance information supplied by the distance sensor by way of height profiles, wherein
   the feeler device has a feeler surface embodied so as to correspond to a shape of the visual field, said feeler surface reproducing a distance image recorded by the distance sensor by means of a height profile corresponding to the distance image.

* * * * *